(12) United States Patent
Bartels et al.

(10) Patent No.: US 7,193,509 B2
(45) Date of Patent: Mar. 20, 2007

(54) DOOR SYSTEM FOR A MOTOR VEHICLE

(75) Inventors: Arne Bartels, Braunschweig (DE); Falk Beil, Braunschweig (DE); Brian Finn, East Palo Alto, CA (US); Klaus Schaaf, Braunschweig (DE)

(73) Assignee: Volkswagen AG, Wolfsburg (DE)

( * ) Notice: Subject to any disclaimer, the term of this patent is extended or adjusted under 35 U.S.C. 154(b) by 146 days.

(21) Appl. No.: 10/927,991

(22) Filed: Aug. 26, 2004

(65) Prior Publication Data

US 2005/0280518 A1 Dec. 22, 2005

Related U.S. Application Data

(60) Provisional application No. 60/498,335, filed on Aug. 26, 2003.

(51) Int. Cl.
*B60Q 1/00* (2006.01)
(52) U.S. Cl. .................. 340/436; 701/301; 318/466
(58) Field of Classification Search ............... 340/436; 701/301; 318/466
See application file for complete search history.

(56) References Cited

U.S. PATENT DOCUMENTS

| | | | |
|---|---|---|---|
| 4,458,446 A * | 7/1984 | Mochida et al. ............. 49/28 |
| 6,204,753 B1 | 3/2001 | Schenk et al. | |
| 6,297,605 B1 * | 10/2001 | Butler et al. ............. 318/466 |
| 6,676,186 B2 * | 1/2004 | Greif ....................... 296/50 |
| 2002/0033613 A1 * | 3/2002 | Auer et al. ................. 296/76 |
| 2005/0242618 A1 * | 11/2005 | Menard .................... 296/146.4 |

FOREIGN PATENT DOCUMENTS

| | | |
|---|---|---|
| DE | 41 19 579 | 12/1992 |
| DE | 195 37 619 | 4/1997 |
| DE | 198 08 181 | 9/1999 |
| DE | 198 36 310 | 3/2000 |
| DE | 100 04 161 | 8/2001 |
| DE | 100 56 569 | 5/2002 |
| JP | 402114018 A * | 4/1990 |
| JP | 3-61120 | 3/1991 |
| JP | 408285184 A * | 11/1996 |
| WO | WO 96/33079 | 10/1996 |

\* cited by examiner

*Primary Examiner*—Jeffery Hofsass
*Assistant Examiner*—Samuel J Walk
(74) *Attorney, Agent, or Firm*—Kenyon & Kenyon LLP

(57) ABSTRACT

A door system for a motor vehicle includes a door, an environmental sensor for detecting an obstacle in the vicinity of the motor vehicle, a door sensor for outputting an output signal as a function of the initiation of the opening of the door, and a control unit for detecting an imminent collision between the door and the obstacle as a function of an output signal of the environmental sensor and for triggering a warning device such that a warning may be output by the warning device in response to the detection of an imminent collision between the door and the obstacle. During the triggering of the warning device, the control unit distinguishes between at least two selectable warning stages, a first warning stage and a second warning stage, and the selection of a warning stage by the control unit is a function of the output signal of the door sensor.

16 Claims, 11 Drawing Sheets

DOOR SYSTEM FOR A MOTOR VEHICLE

CROSS-REFERENCE TO RELATED APPLICATIONS

The present application claims the benefit of U.S. Provisional Application No. 60/498,335, filed on Aug. 26, 2003, which is expressly incorporated herein in its entirety by reference thereto.

FIELD OF THE INVENTION

The present invention relates to a door system for a motor vehicle. More particular, the present invention relates to a door system for a motor vehicle, which may include a door, an environmental sensor for detecting an obstacle in the vicinity of the motor vehicle, a door sensor for outputting an output signal as a function of the initiation of the opening of the door, and a control unit for detecting an imminent collision between the door and the obstacle as a function of an output signal of the environmental sensor and for triggering a warning device such that a warning may be output by the warning device in response to the detection of an imminent collision between the door and the obstacle.

BACKGROUND INFORMATION

German Published Patent Application No. 195 37 619 describes a device for monitoring the road space of a motor vehicle, having at least one road-space sensor for detecting a body approaching the vehicle and a corresponding signaling system and/or a locking device for at least one door, which functions when the vehicle is standing still or almost standing still. The system or locking device is activated in response to a person/hand approaching at least one door handle, and, in response to the approach of a body in the road space, the opening of at least one door of the vehicle is prevented, rendered more difficult, or blocked, and/or an optical and/or acoustic signaling system indicates this approach of the body. In this context, at least one sensor detects the action state of the vehicle.

German Published Patent Application No. 100 56 569 describes a vehicle having at least one hinged door and a device for preventing the door from colliding with an object adjacent to the vehicle while the door is opened, a sensor having an evaluating logic circuit detecting the position and change of position of the object relative to the vehicle during a vehicle movement immediately preceding the opening of the door, and a warning signal or a locking device being triggered in response to the danger of a collision between the object and the vehicle door.

German Published Patent Application No. 198 36 310 describes a vehicle-door restraint device, which mechanically inhibits the opening of the door, at the latest, at or beyond an opening angle that is still safe, and/or which triggers an acoustic and/or optical restraint signal, the restraint device being controlled by a monitoring device, which monitors the exterior region of the vehicle for the presence of stationary and/or approaching obstacles, in particular in the opening region of the vehicle doors in question.

German Published Patent Application No. 198 08 181 describes a device for the collision protection of protruding parts of motor vehicles, the device having a controllable positioning mechanism for at least drawing in and/or folding in the protruding motor-vehicle parts. In this context, at least one distance sensor or proximity sensor, which is functionally connected to the positioning mechanism, is, e.g., situated in an outside mirror, and is for detecting the distance and/or the approach of an object relative to a specific, protruding motor-vehicle part, is provided on the vehicle, the positioning mechanism drawing in or folding in the motor-vehicle part in question in response to a detection signal that is supplied by the sensor and indicates a danger of colliding with the object. Sensors installed in the outside-mirror housings, and the detection results ascertained from their detection signals, may be used for further functions. Examples of this include a door-opening warning signal or the blocking of the opening of a door when an object is too close to the door to be opened.

German Published Patent Application No. 100 04 161 describes an adaptive door-handle lock for motor vehicles having a locking device, which enables or prevents the opening of a vehicle door as a function of at least one sensor-detected, vehicle-vicinity situation and includes a door-locking system, an environmental sensory system provided on or in the vehicle, and a monitoring device acting upon the door-locking system. The environmental sensory system generates signals that are supplied to the monitoring device, which control the door-locking system such that it keeps the door locked permanently, or for a certain or definable period of time, when the signals supplied by the environmental sensory system reveal that the safety in opening the door is questionable due to the vehicle-vicinity situation.

German Published Patent Application No. 41 19 579 describes a device for detecting objects not directly in the field of view of a motor vehicle, having a contactless distance-measuring device oriented in the field of view and a controlled door brake, which may be activated prior to or during the movement of the door, in response to an object approaching the vehicle.

Further safety systems for doors of a motor vehicle are described, for example, in PCT International Published Patent Application No. WO 96/33079 and Japanese Published Patent Application No. 3-61120.

SUMMARY

According to an example embodiment of the present invention, a door system for a motor vehicle having a door includes an environmental sensor for detecting an obstacle in the vicinity of the motor vehicle, a door sensor for outputting an output signal as a function of the initiation of the opening of the door, and a control unit for detecting an imminent collision between the door and the obstacle as a function of an output signal of the environmental sensor and for triggering a warning device such that a warning may be output by the warning device in response to the detection of an imminent collision between the door and the obstacle, and, during the triggering of the warning device, the control unit distinguishing between at least two selectable warning stages, a first warning stage and a second warning stage, the selection of a warning stage by the control unit being a function of the output signal of the door sensor.

A door in the present context may be, e.g., a side door, a tailgate, etc., of a motor vehicle. An environmental sensor in the present context may be, e.g., an ultrasonic sensor, a radar sensor, a laser sensor, etc. A door sensor in the present context may be, e.g., a sensor for detecting the (imminent) manipulation of a door opener. However, a door sensor in the present context may also be a sensor, by which an opening angle of a door may be detected. The opening of a door may also be detected, for example, using the manipulation of a door-release lever and/or using a touch-sensitive switch in the door, etc.

In an example embodiment of the present invention, the first warning stage is selected by the control unit, when the initiation of the opening of the door is not detected. However, when the initiation of the opening of the door is detected, an example embodiment of the present invention provides for the second warning stage to be selected by the control unit.

In an example embodiment of the present invention, the warning device has a first indicator for displaying an optical warning assigned to the first warning stage. In an example embodiment of the present invention, an optical warning, which is assigned to the second warning stage and is distinguishable from the optical warning assigned to the first warning stage, may be output by the first indicator.

In an example embodiment of the present invention, the warning device has a second indicator for displaying an optical warning assigned to the second warning stage.

In an example embodiment of the present invention, the warning device has a loud speaker for outputting an acoustic warning assigned to the second warning stage, an actuator for outputting a haptic warning assigned to the second warning stage, a controllable damping device for generating a mechanical resistance during the opening of the door, in response to the presence of the second or a further warning stage, and/or a door-locking mechanism for locking the door in response to the presence of the second or a further warning stage.

In an example embodiment of the present invention, an obstacle in the surrounding area above the motor vehicle may be detected by the environmental sensor.

According to an example embodiment of the present invention, a door system for a motor vehicle having a tailgate includes an environmental sensor for detecting an obstacle in the surrounding area above the motor vehicle and a control unit for detecting an imminent collision between the tailgate and the obstacle as a function of an output signal of the environmental sensor, the collision being made imminent by the opening of the tailgate.

A motor vehicle in the present context is, e.g., a land vehicle that is able to be used individually in road traffic. Motor vehicles in the present context are not limited, e.g., to land vehicles having combustion engines.

According to an example embodiment of the present invention, a door system for a motor vehicle includes: a door; an environmental sensor configured to detect an obstacle in a vicinity of the motor vehicle; a door sensor configured to output an output signal as a function of an initiation of opening of the door; and a control unit configured to detect an imminent collision between the door and the obstacle as a function of an output signal of the environmental sensor and configured to trigger a warning device to output a warning in response to detection of an imminent collision between the door and the obstacle, the control unit configured to distinguish, during trigger of the warning device, between at least two selectable warning stages as a function of the output signal of the door sensor.

The control unit may be configured to select a first warning stage of the at least two warning stages when no initiation of the opening of the door is detected.

The control unit may be configured to select a second warning stage of the at least two warning stages when the initiation of the opening of the door is detected.

The warning device may include a first indicator configured to display an optical warning assigned to a first warning stage of the at least two warning stages.

The first indicator may configured to output an optical warning assigned to a second warning stage of the at least two warning stages, and the optical warning assigned to the second warning stage may be different from the optical warning assigned to the first warning stage.

The warning device may include a second indicator configured to display an optical warning assigned to a second warning stage of the at least two warning stages.

The warning device may include a loudspeaker configured to output an acoustic warning assigned to a second warning stage of the at least two warning stages.

The warning device may include an actuator configured to output a haptic warning assigned to a second warning stage of the at least two warning stages.

The warning device may include a controllable damping device configured to generate a mechanical resistance during the opening of the door in response to a presence of one of (a) a second warning stage and (b) a further warning stage of the at least two warning stages.

The warning device may include a door-locking mechanism configured to lock the door in response to a presence of one of (a) a second warning stage and (b) a further warning stage of the at least two warning stages.

The door may include a tailgate.

The environmental sensor may be configured to detect an obstacle in a surrounding area above the motor vehicle.

According to an example embodiment of the present invention, a door system for a motor vehicle, which includes a tailgate, includes: an environmental sensor configured to detect an obstacle in a surrounding area above the motor vehicle; and a control unit configured to detect an imminent collision between the tailgate and the obstacle if the tailgate is opened as a function of an output signal of the environmental sensor.

According to an example embodiment of the present invention, a door system for a motor vehicle includes: door means; environmental sensing means for detecting an obstacle in a vicinity of the motor vehicle; door sensing means for outputting an output signal as a function of an initiation of opening of the door means; and control means for detecting an imminent collision between the door means and the obstacle as a function of an output signal of the environmental sensing means and for triggering warning means for outputting a warning in response to detection of an imminent collision between the door means and the obstacle, the control means for distinguishing, during trigger of the warning means, between at least two selectable warning stages as a function of the output signal of the door sensing means.

Further aspects and details are set forth in the following description of example embodiments with reference to the appended Figures.

DETAILED DESCRIPTION

Figure 1:
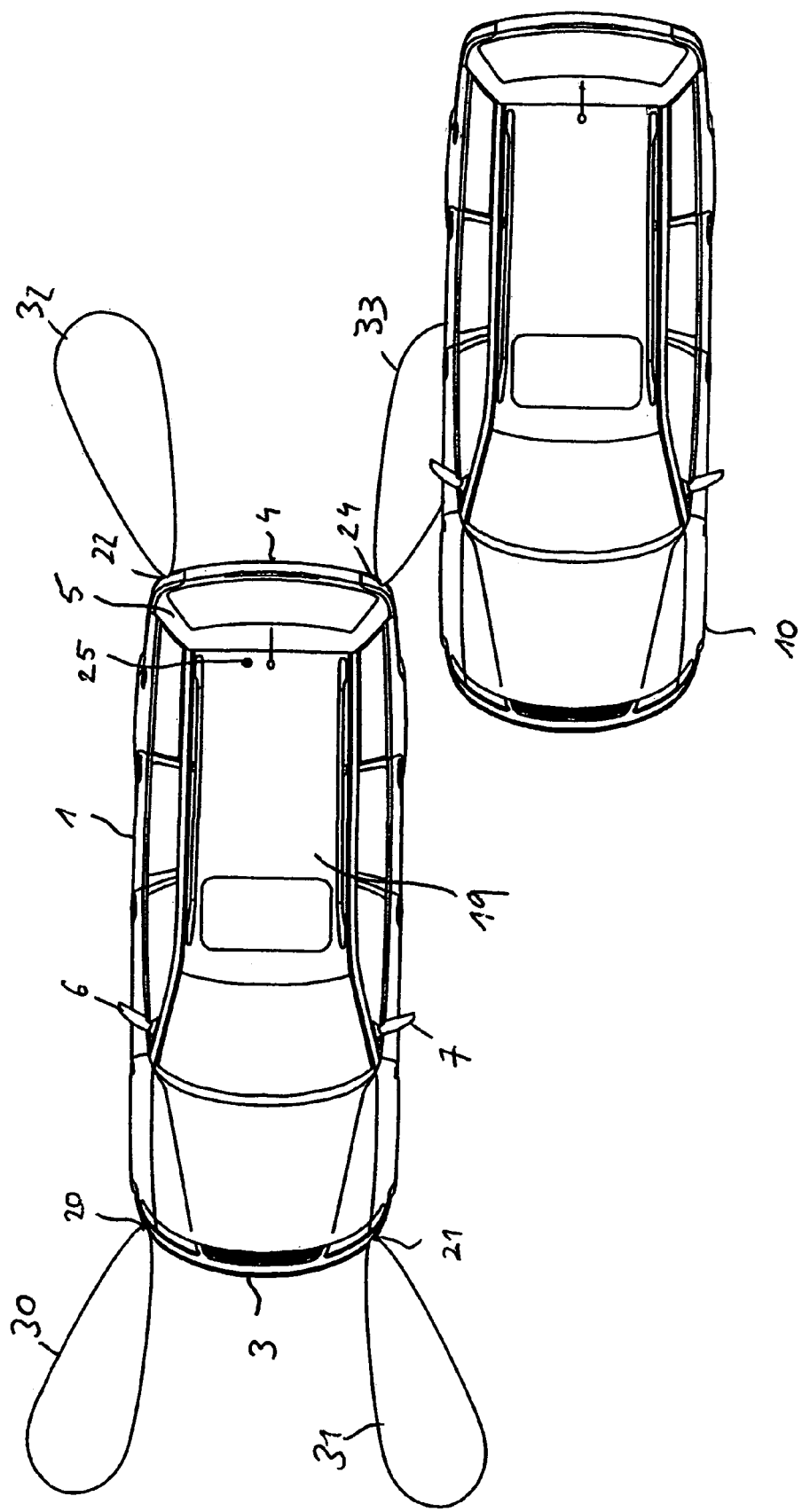
FIG. 1 is a plan view of a motor vehicle.
Figure 2:
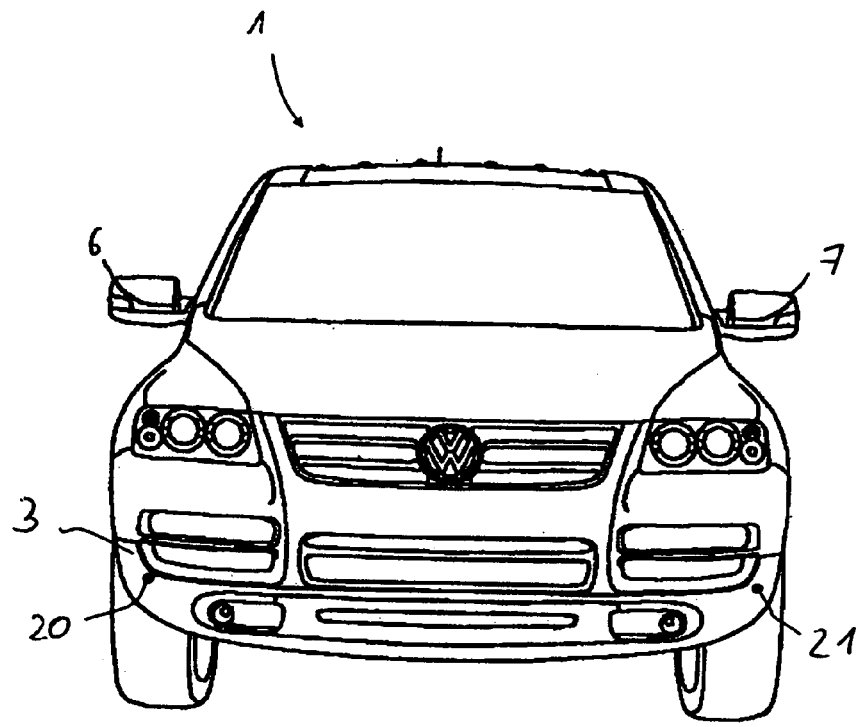
FIG. 2 is a front view of a motor vehicle.
Figure 3:
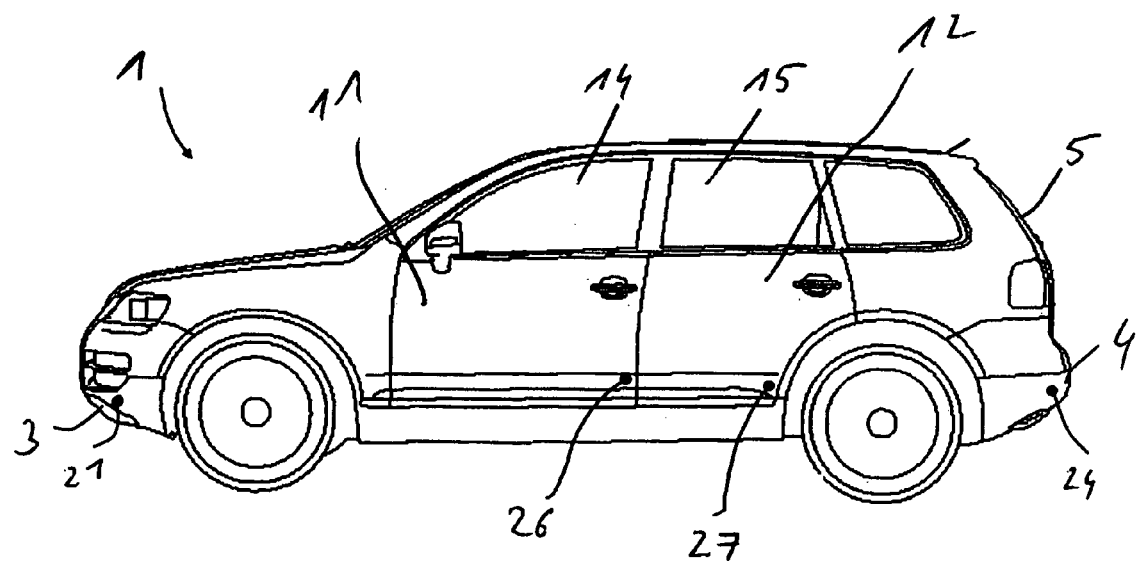
FIG. 3 is a side view of a motor vehicle.

FIGS. 1 to 3 illustrate a motor vehicle 1. FIG. 1 is a top view of motor vehicle 1, FIG. 2 is a front view of motor vehicle 1, and FIG. 3 is a side view of motor vehicle 1. At a front bumper 3, motor vehicle 1 has two environmental sensors 20 and 21 for detecting an obstacle, such as the motor vehicle indicated by reference numeral 10, in the vicinity of motor vehicle 1. Further environmental sensors 22, 24, 26, and 27 for detecting an obstacle in the vicinity of motor vehicle 1 are provided on a rear bumper 4, and on side doors 11 and 12. A further environmental sensor 25 is arranged on a roof 19 of motor vehicle 1.

Environmental sensors 25, 26, and 27 may be arranged as ultrasonic sensors. Environmental sensors 26 and 27 may be substantially oriented in the transverse direction of motor vehicle 1, and environmental sensor 25 may be pointed upwardly. Environmental sensors 20, 21, 22, and 24 may be arranged as radar sensors. As indicated by lobes 30, 31, 32, and 33, environmental sensors 20, 21, 22, and 24 are pointed diagonally outwardly.

Reference numerals 6 and 7 designate outside mirrors, reference numerals 14 and 15 designate side windows, and reference numeral 5 designates a tailgate.

Figure 4:
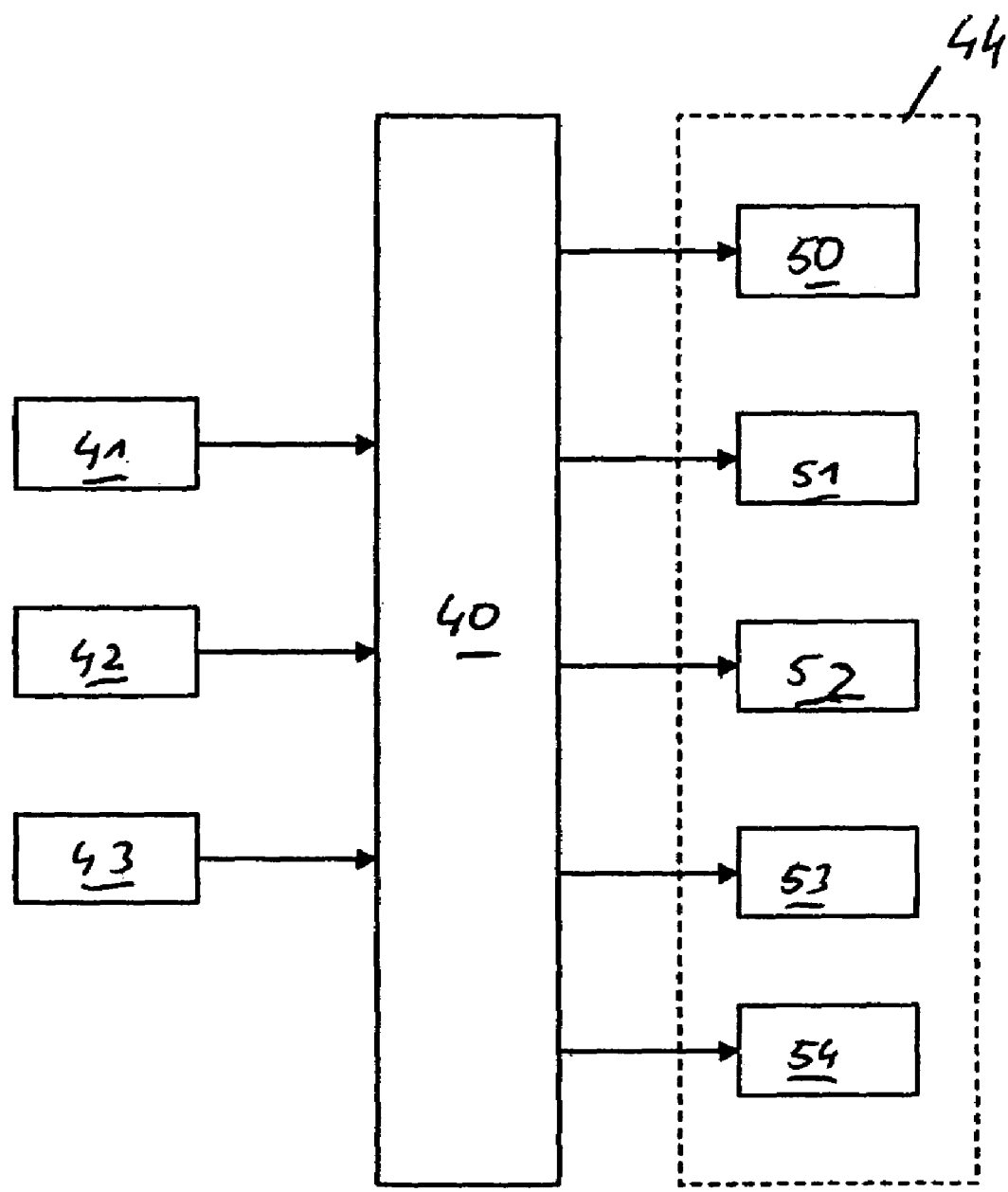
FIG. 4 schematically illustrates a door system.
Figure 5:
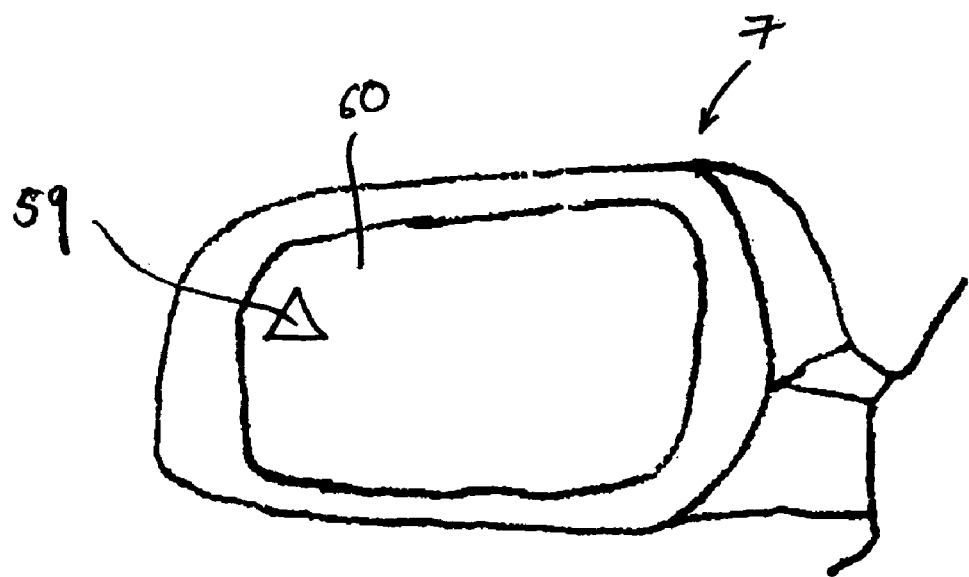
FIG. 5 illustrates an exemplary embodiment of an outside mirror.

In order to prevent collisions with an obstacle, such as the passing vehicle indicated by reference numeral 10, when door 11 and/or 12 is opened, motor vehicle 1 has a door system, which is explained in detail with reference to FIG. 4. The door system has one or more of environmental sensors 20, 21, 22, 24, 25, 26, and 27, which is indicated in FIG. 4 by an environmental sensor designated by reference numeral 41.

In addition, the door system has a door-opener sensor 42 for detecting (imminent) manipulation of a door opener, and optionally has an opening sensor 43, by which an opening angle of a door 11 or 12 may be detected. In the present context, a door sensor for outputting an output signal as a function of the initiation of the opening of the door may be a door-opener sensor 42 and/or an opening sensor 43.

Environmental sensor 41, door-opener sensor 42, and opening sensor 43 are connected to a control unit 40 for detecting an imminent collision between door 11 or 12 and an obstacle, such as the passing vehicle indicated by reference numeral 10, and for triggering a warning device 44. Warning device 44 has at least one indicator 50 for displaying an optical warning, at least one loudspeaker 51 for outputting at least one acoustic warning, at least one actuator 52 for outputting a haptic warning, at least one controllable damping device 53 for generating a mechanical resistance during the opening of door 11 or 12, and/or at least one door-locking mechanism 54 for locking door 11 or 12.

During the triggering of warning device 44, control unit 40 distinguishes between two selectable warning stages, a first warning stage and a second warning stage, or more than two warning stages, control unit 40 choosing a warning stage as a function of an output signal of door-opener sensor 42 and/or as a function of an output signal of opening sensor 43. However, the control unit may distinguish between the first warning stage and the second warning stage. In this context, the first warning stage is selected, when an imminent collision between door 11 or 12 and an obstacle is detected, but the initiation of the opening of door 11 or 12 is not detected. However, the second warning stage is selected, when an imminent collision between door 11 or 12 and an obstacle is detected, and the initiation of the opening of door 11 or 12 is detected.

In the first warning stage, the driver and passenger may be warned, for example, by a warning lamp (e.g., indicator 50 or part of indicator 50), which is mounted to or near outside mirrors 6 and 7. Options for positioning this warning lamp, for positioning a status indicator, as well as for dimming the warning lamp and the status indicator with the aid of a light sensor are described with reference to the following Figures.

An additional, more intensive warning occurs in the second warning stage. The more intensive warning may be, e.g., optical (indicator 50) and/or acoustic (loudspeaker 51) and/or haptic (actuator 52). In addition, the opening of the door may be made more difficult (controllable damping device 53) and/or completely prevented (locking mechanism 54). The warning lamps of the first warning stage may be used for displaying the more intensive, optical warning.

An acoustic warning message may be generated, e.g., using a simple tone (e.g., beeper), a simple sequence of notes (e.g., jingle), or a complex sequence of notes (e.g., voice message). Loudspeakers already installed in the vehicle, such as door loudspeakers, loudspeakers in an instrument cluster, or loudspeakers of other applications such as loudspeakers of a park-distance control system or a lane-change assistant, etc., may be used as audio oscillators. However, separate loudspeakers may also be installed for the door system.

Vibration of a door opener or the seat cushion with the aid of actuator 52 may be provided as a haptic warning to the occupants.

The opening of the door may be made more difficult by controllable damping device 53, in that the required force for operating the door opener is increased. In addition, the necessary force for pivoting door 11 or 12 is increased by controllable damping device 53. For example, electro-rheological or magneto-rheological substances may be used for this. These may be, for example, liquids (electro-rheological or magneto-rheological liquids (ERF, MRF)), or also solids. In the case of ERF and MRF substances, the resistance to flow increases in response to the application of an electric field and a magnetic field, respectively. They react within a few milliseconds and return again to their original state after the field is switched off. If these liquids are used, for example, in a damper, then its damping constant may be electrically varied in a continuous manner. If this damper is used in a vehicle door, then the door-opening torque or the force for opening the door may be adjusted continuously.

FIGS. 5 to 10 illustrate exemplary embodiments of indicator 50 in outside mirror 7 for displaying an optical warning to an occupant of motor-vehicle 1 in a front seat. In the exemplary embodiment illustrated in FIG. 5, a triangular lamp 59, which is illuminated, e.g., in a substantially constant manner in the first warning stage and flashes in the second warning stage, is provided in a mirror surface 60.

Figure 6:
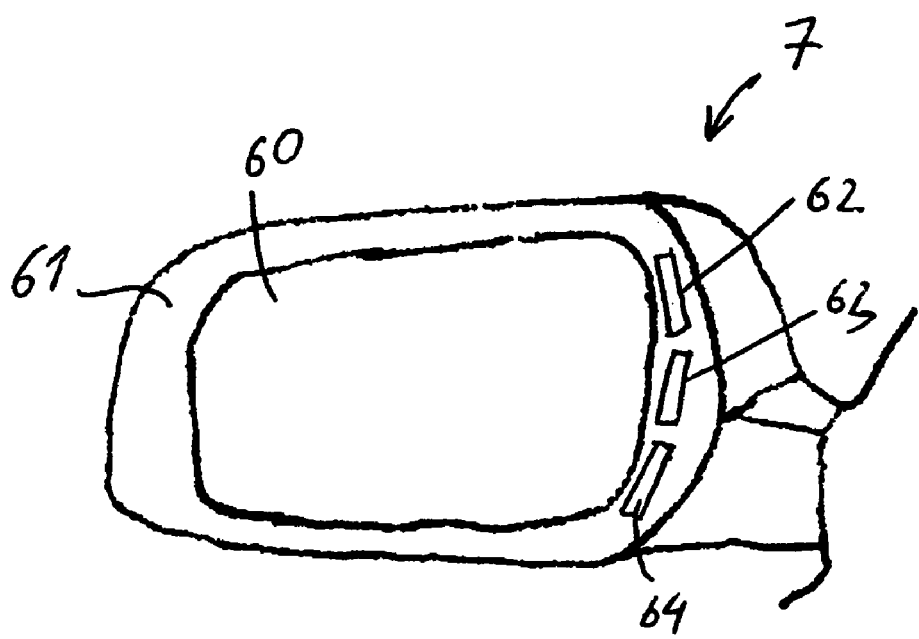
FIG. 6 illustrates an-exemplary embodiment of an outside mirror.

In the exemplary embodiment illustrated in FIG. 6, three LED elements 62, 63, and 64 are provided in a frame 61 of outside mirror 7, LED element 63 being illuminated, e.g., in a substantially constant manner in the first warning stage, and LED elements 62 and 64 alternately flashing in the second warning stage.

Figure 7:
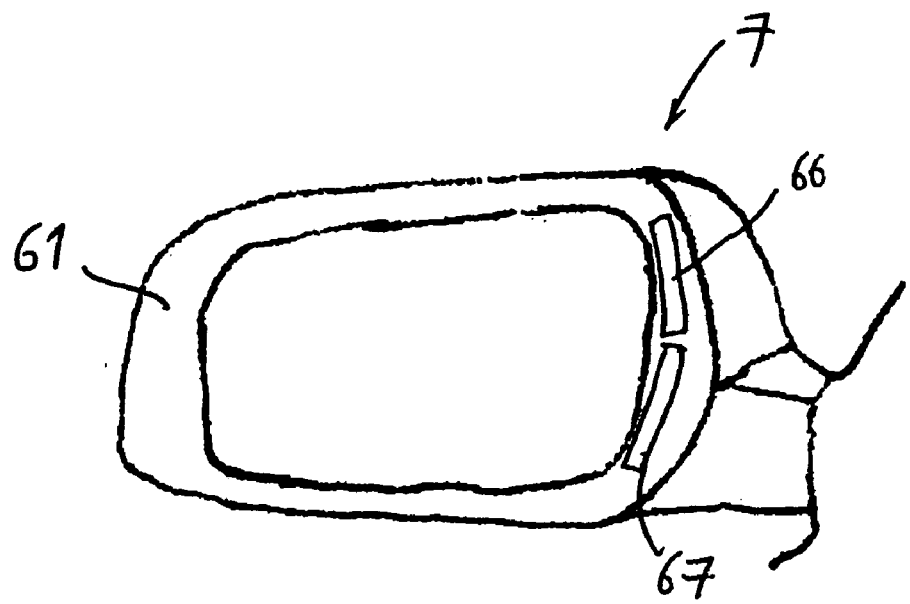
FIG. 7 illustrates an exemplary embodiment of an outside mirror.

In the exemplary embodiment illustrated in FIG. 7, two LED elements 66 and 67 are provided in frame 61 of outside mirror 7, LED elements 66 and 67 being illuminated, e.g., in a substantially constant manner in the first warning stage and alternately flashing in the second warning stage.

Figure 8:
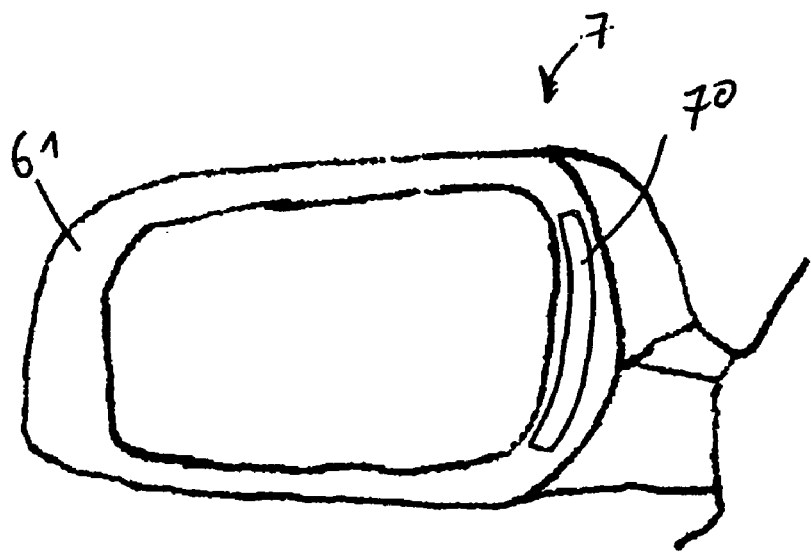
FIG. 8 illustrates an exemplary embodiment of an outside mirror.

In the exemplary embodiment illustrated in FIG. 8, an oblong lamp 70 (LED), which is illuminated, e.g., in a substantially constant manner in the first warning stage and flashes in the second warning stage, is provided for frame 61 of outside mirror 7. Double-flashing occurring in rapid succession may be provided in each period.

Figure 9:
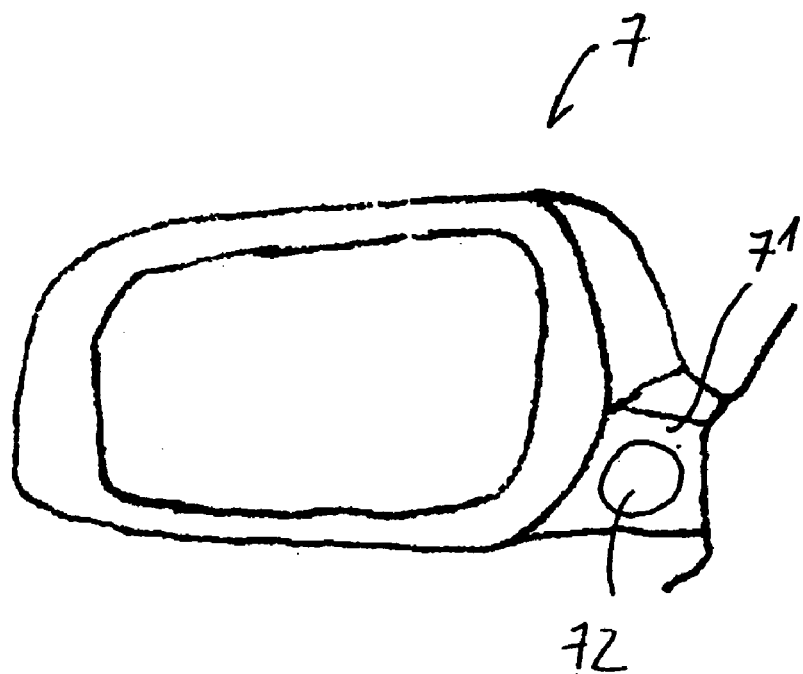
FIG. 9 illustrates an exemplary embodiment of an outside mirror.

In the exemplary embodiment illustrated in FIG. 9, a circular lamp 72 (LED), which is illuminated, e.g., in a substantially constant manner in the first warning stage and flashes in the second warning stage, is provided in a mount fixture 71 for outside mirror 7.

Figure 10:
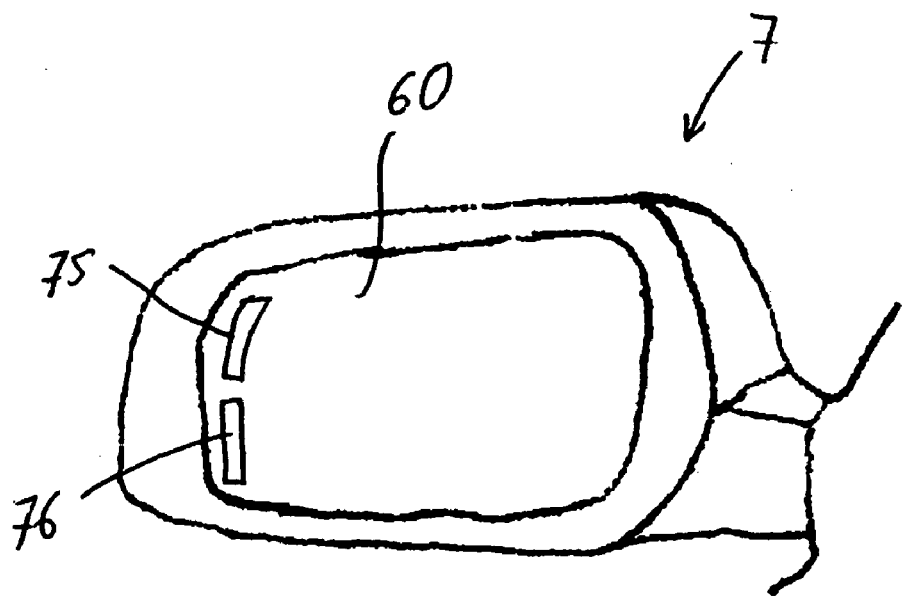
FIG. 10 illustrates an exemplary embodiment of an outside mirror.

In the exemplary embodiment illustrated in FIG. 10, two lamps 75 and 76 are provided in mirror surface 60 of outside mirror 7, lamps 75 and 76 being illuminated, e.g., in a substantially constant manner in the first warning stage and alternately flashing in the second warning stage.

Substantially constant illumination may include dimming in response to switching-on and/or switching-off, e.g., triggering with the aid of a ramp.

FIGS. 11 to 18 illustrate exemplary embodiments of indicator 50 in the interior of motor vehicle 1, for displaying an optical warning to a back-seat occupant of motor-vehicle 1. In this context, FIGS. 11 to 18 illustrate a section of the interior of motor vehicle 1, as viewed from the inside, in the direction of the outside. Reference numeral 80 in FIGS. 11 to 18 refers to an interior light, and reference numeral 100 refers to a door-lock button.

Figure 11:
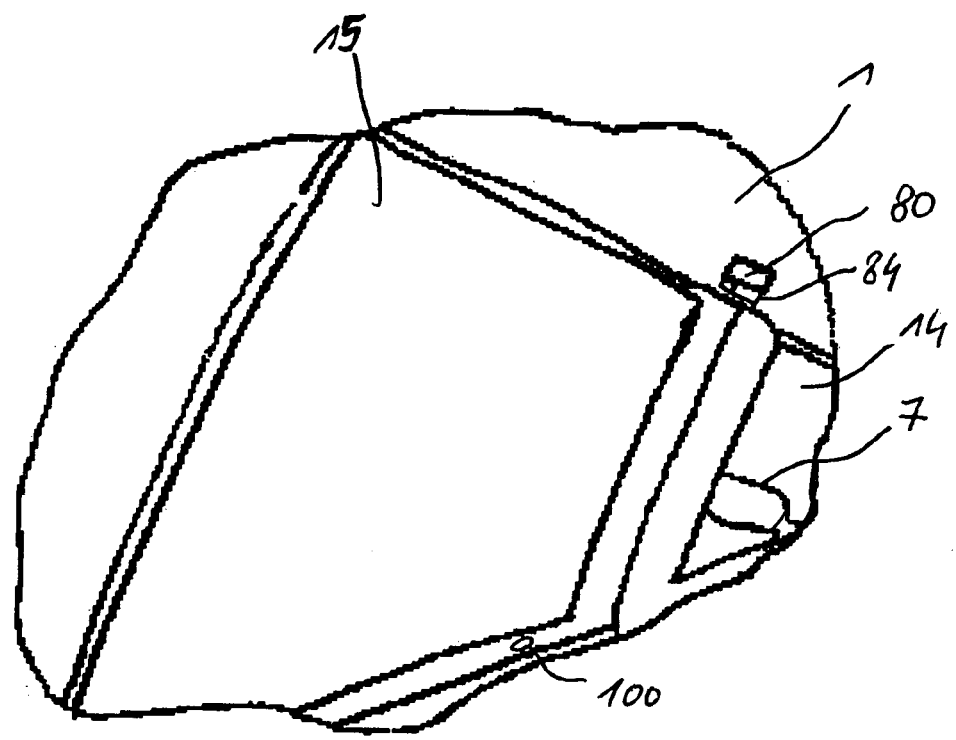
FIG. 11 illustrates an exemplary embodiment of an internal view of a motor vehicle.
Figure 12:
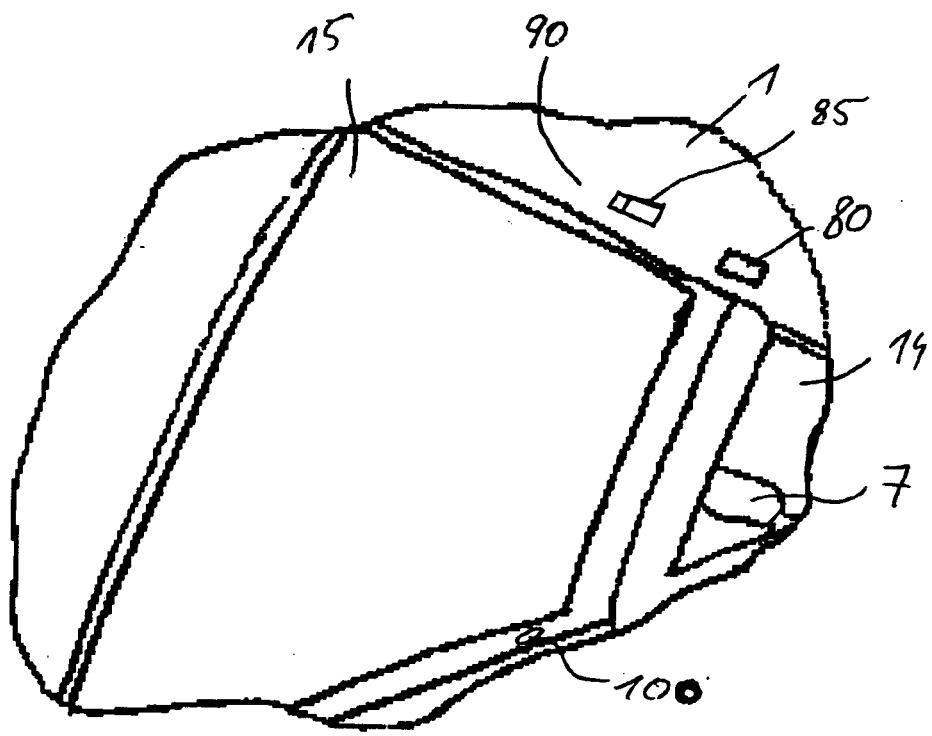
FIG. 12 illustrates an exemplary embodiment of an internal view of a motor vehicle.
Figure 13:
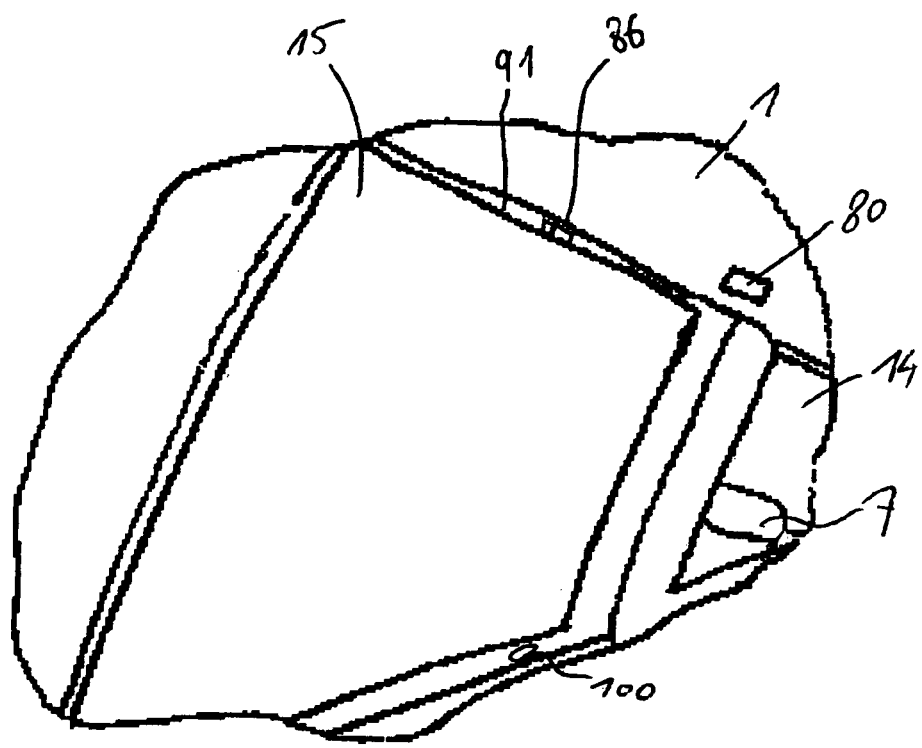
FIG. 13 illustrates an exemplary embodiment of an internal view of a motor vehicle.
Figure 14:
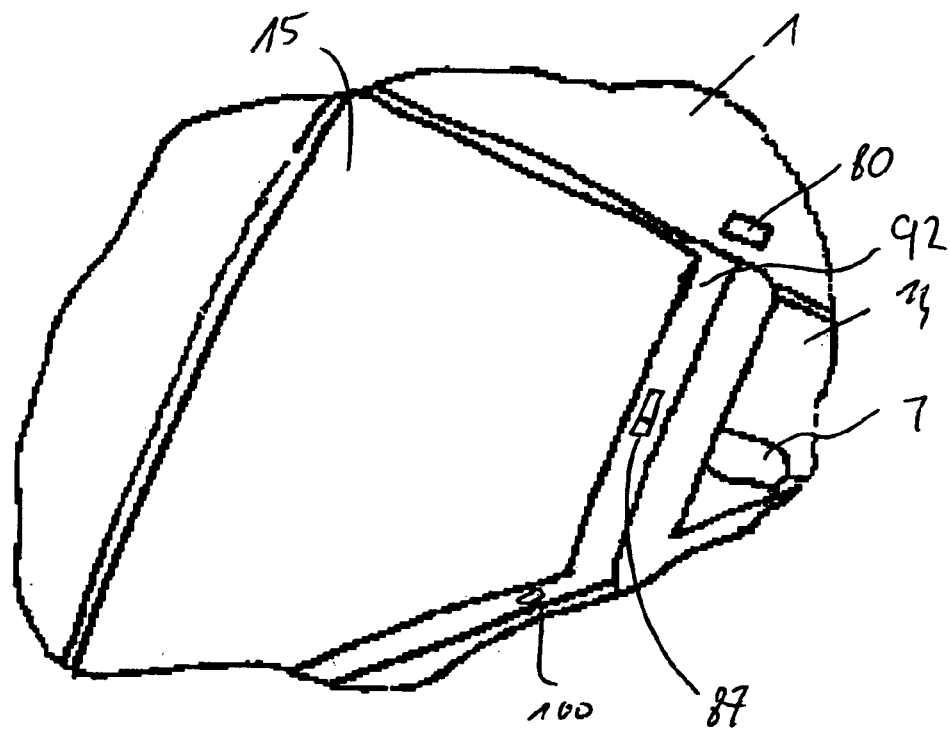
FIG. 14 illustrates an exemplary embodiment of an internal view of a motor vehicle.
Figure 15:
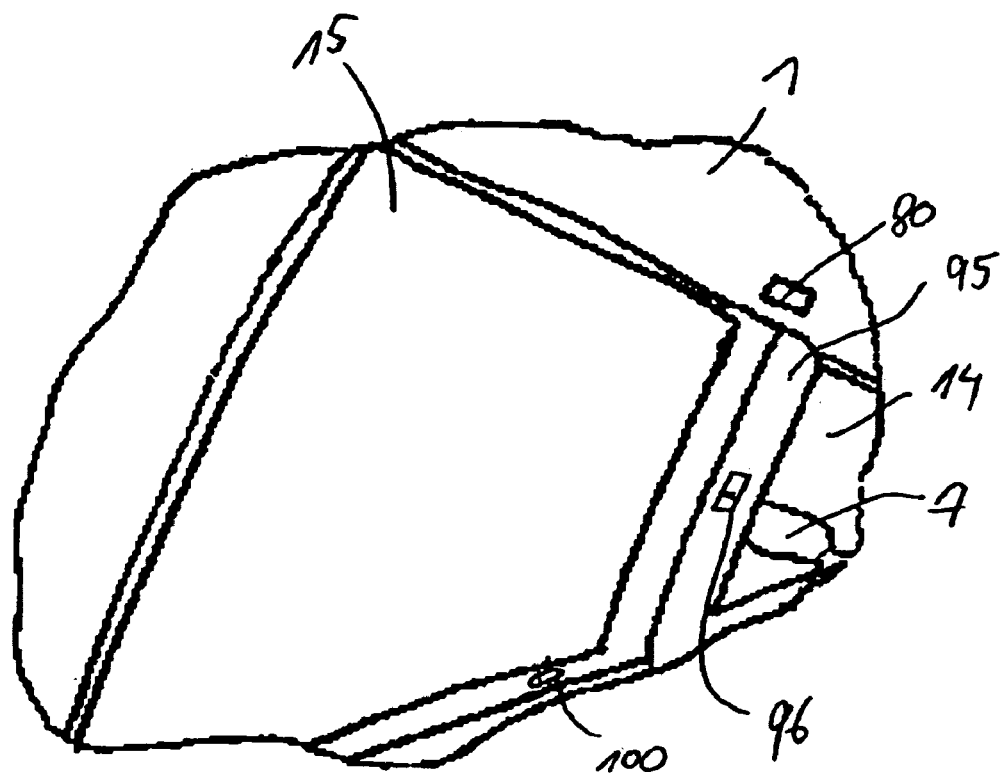
FIG. 15 illustrates an exemplary embodiment of an internal view of a motor vehicle.
Figure 16:
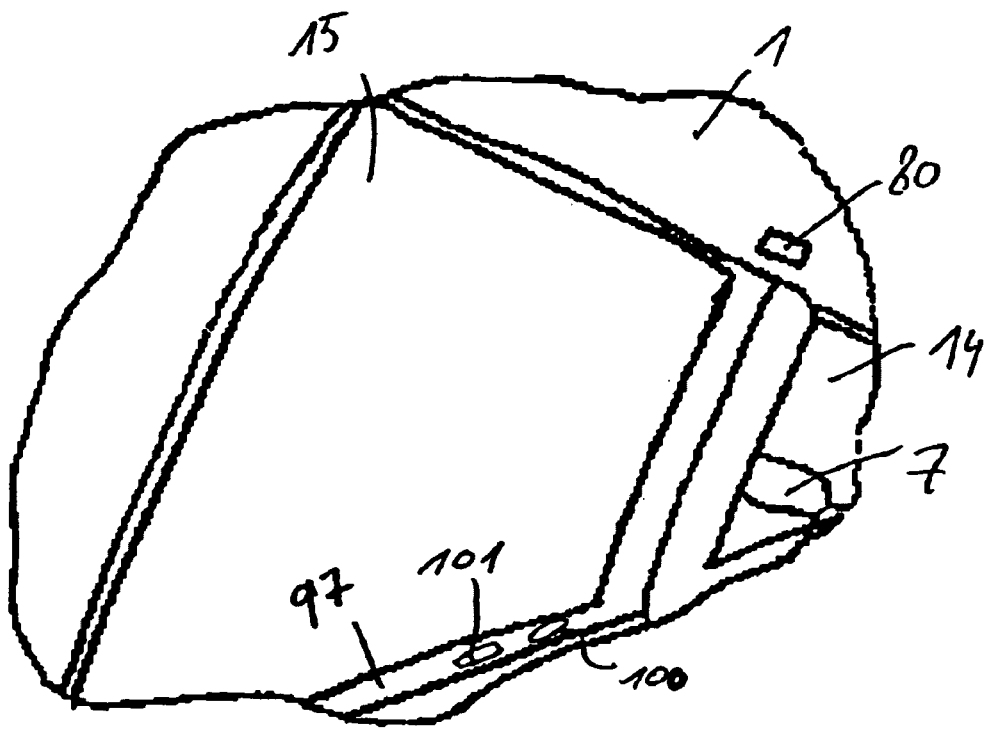
FIG. 16 illustrates an exemplary embodiment of an internal view of a motor vehicle.
Figure 17:
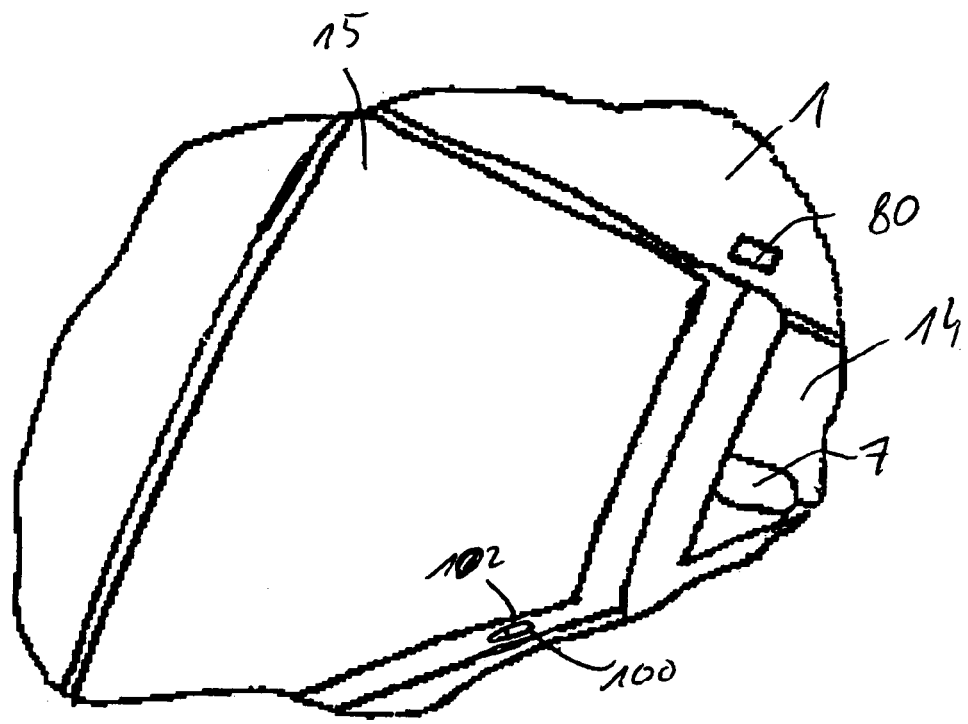
FIG. 17 illustrates an exemplary embodiment of an internal view of a motor vehicle.
Figure 18:
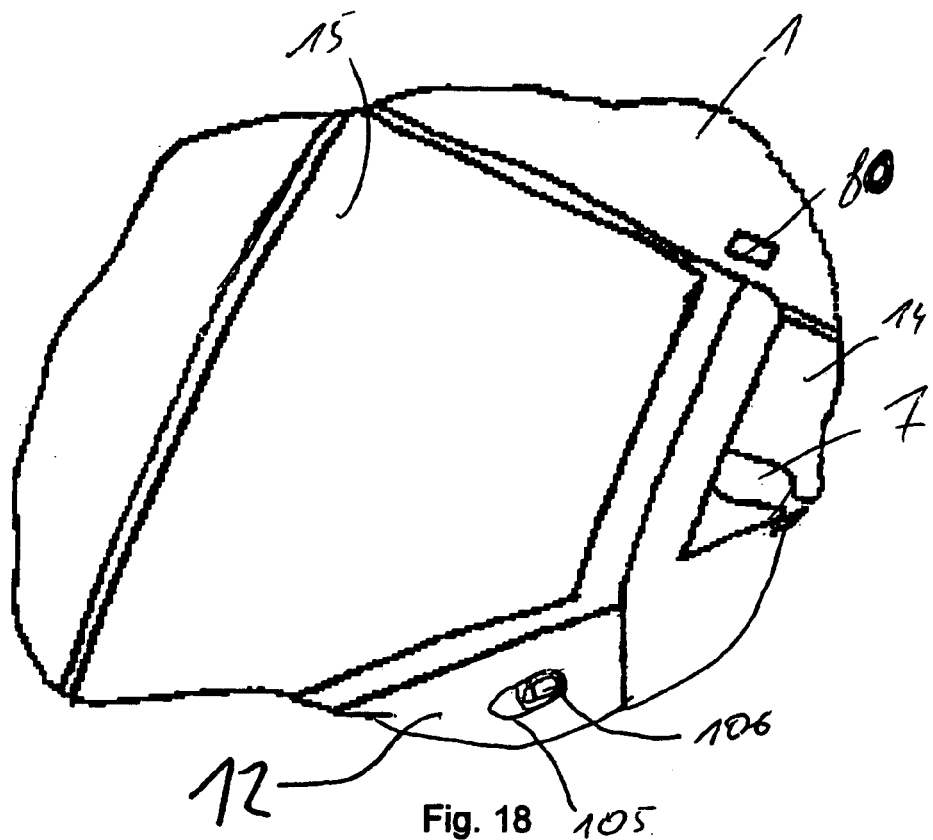
FIG. 18 illustrates an exemplary embodiment of an internal view of a motor vehicle.

In the exemplary embodiment illustrated in FIG. 11, an indicator 84 provided as a part of indicator 50 is integrated into interior light 80. In the exemplary embodiment illustrated in FIG. 12, an indicator 85 provided as a part of indicator 50 is positioned on a roof 90. In the exemplary embodiment illustrated in FIG. 13, an indicator 86 provided as a part of indicator 50 is positioned in an upper window frame 91. In the exemplary embodiment illustrated in FIG. 14, an indicator 87 provided as a part of indicator 50 is positioned in a side window frame 92. In the exemplary embodiment illustrated in FIG. 15, an indicator 96 provided as a part of indicator 50 is arranged in a B-pillar, e.g., in the region of a belt. In the exemplary embodiment illustrated in FIG. 16, an indicator 101 provided as a part of indicator 50 is positioned in a lower window frame 97. In the exemplary embodiment illustrated in FIG. 17, an indicator 102 provided as a part of indicator 50 is positioned on door-lock button 100. In the exemplary embodiment illustrated in FIG. 18, an indicator 106 provided as a part of indicator 50 is arranged in the region of a lever 105 for opening door 12.

Figure 19:
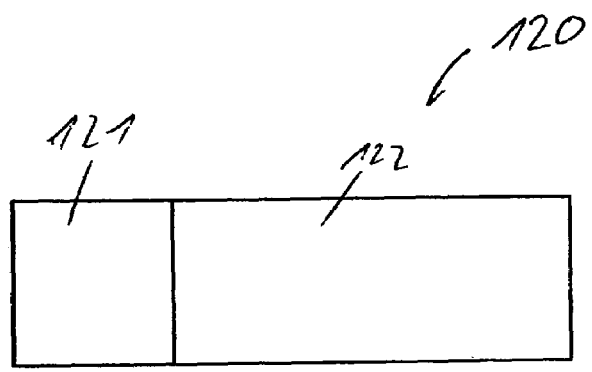
FIG. 19 illustrates an indicator.

FIG. 19 illustrates an indicator 120 as an exemplary embodiment for indicators 84, 85, 86, 87, 96, 101, 102, and 106. Indicator 120 has a yellow status lamp 121 and a red warning lamp 122, status lamp 121 being illuminated in the first warning stage and warning lamp 122 being illuminated in the second warning stage.

Figure 20:
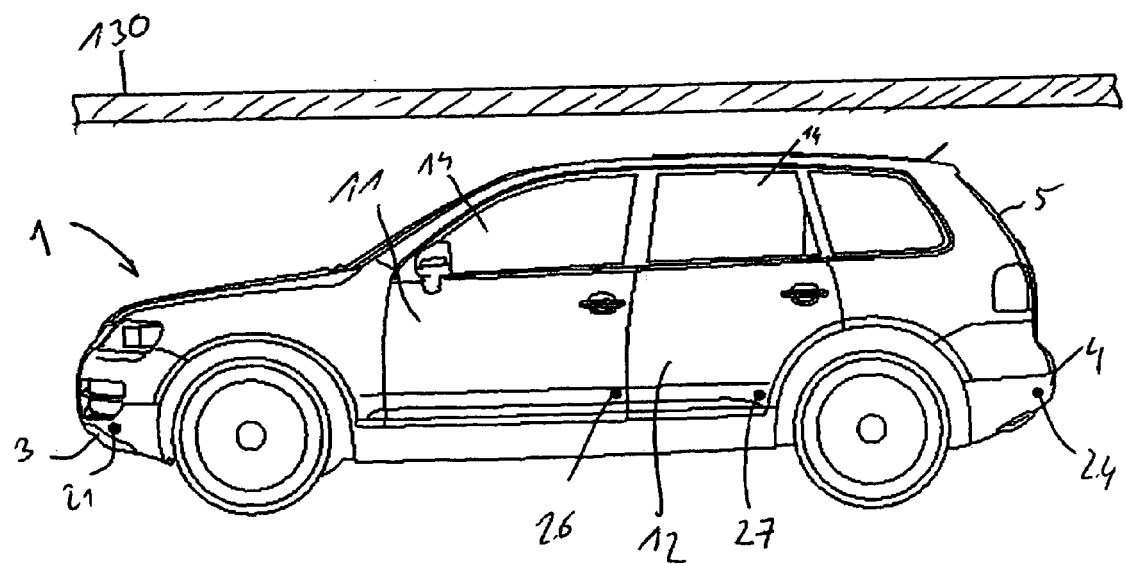
FIG. 20 is a side view of a motor vehicle.

Previous explanations regarding the prevention of a collision between doors 11 and 12 and an obstacle may also include tailgate 5. A collision, which is made imminent by the opening of tailgate 5 and occurs between tailgate 5 and an obstacle 130 illustrated in FIG. 20 in a surrounding area above motor vehicle 1, is preventable by control unit 50, which evaluates an output signal of environmental sensor 25.

LIST OF REFERENCE NUMERALS 1,10 motor vehicle
3,4 bumper
5 tailgate
6,7 outside mirror
11,12 door
14,15 side window
19 roof
20, 21, 22, 24,
25, 26, 27, 41 environmental sensor
30, 31, 32, 33 lobe
40 control unit
42 door-opener sensor
43 opening sensor
44 warning device
50, 84, 85, 86,
87, 96, 101, 102,
106, 120 indicator
51 loudspeaker
52 actuator
53 controllable damping means
54 door-locking mechanism
59, 75, 76 lamp
60 mirror surface
61 frame
62, 63, 64, 66,
67, 70, 72 LED element
71 mount fixture
80 interior lamp
90 roof
91, 92, 97 window frame
100 door-lock button
105 lever
121 status lamp
122 warning lamp
130 obstacle

What is claimed is:

1. A door system for a motor vehicle, comprising:
a door;
an environmental sensor configured to detect an obstacle in a vicinity of the motor vehicle;
a door sensor configured to output an output signal as a function of an initiation of opening of the door; and
a control unit configured to detect an imminent collision between the door and the obstacle as a function of an output signal of the environmental sensor and configured to trigger a warning device to output a warning in response to detection of an imminent collision between the door and the obstacle, the control unit configured to distinguish, during trigger of the warning device, between at least two selectable warning stages as a function of the output signal of the door sensor.

2. The door system according to claim 1, wherein the control unit is configured to select a first warning stage of the at least two warning stages when no initiation of the opening of the door is detected.

3. The door system according to claim 1, wherein the control unit is configured to select a second warning stage of the at least two warning stages when the initiation of the opening of the door is detected.

4. The door system according to claim 1, wherein the warning device includes a first indicator configured to display an optical warning assigned to a first warning stage of the at least two warning stages.

5. The door system according to claim 4, wherein the first indicator is configured to output an optical warning assigned to a second warning stage of the at least two warning stages, the optical warning assigned to the second warning stage different from the optical warning assigned to the first warning stage.

6. The door system according to claim 4, wherein the warning device includes a second indicator configured to display an optical warning assigned to a second warning stage of the at least two warning stages.

7. The door system according to claim 1, wherein the warning device includes a loudspeaker configured to output an acoustic warning assigned to a second warning stage of the at least two warning stages.

8. The door system according to claim 1, wherein the warning device includes an actuator configured to output a haptic warning assigned to a second warning stage of the at least two warning stages.

9. The door system according to claim 1, wherein the warning device includes a controllable damping device configured to generate a mechanical resistance during the opening of the door in response to a presence of one of (a) a second warning stage and (b) a further warning stage of the at least two warning stages.

10. The door system according to claim 1, wherein the warning device includes a door-locking mechanism configured to lock the door in response to a presence of one of (a) a second warning stage and (b) a further warning stage of the at least two warning stages.

11. The door system according to claim 1, wherein the door includes a tailgate.

12. The door system according to claim 1, wherein the environmental sensor is configured to detect an obstacle in a surrounding area above the motor vehicle.

13. A door system for a motor vehicle including a tailgate, comprising:
   an environmental sensor configured to detect an obstacle in a surrounding area above the motor vehicle; and
   a control unit configured to detect an imminent collision between the tailgate and the obstacle if the tailgate is opened as a function of an output signal of the environmental sensor.

14. A door system for a motor vehicle, comprising:
   door means;
   environmental sensing means for detecting an obstacle in a vicinity of the motor vehicle;
   door sensing means for outputting an output signal as a function of an initiation of opening of the door means; and
   control means for detecting an imminent collision between the door means and the obstacle as a function of an output signal of the environmental sensing means and for triggering warning means for outputting a warning in response to detection of an imminent collision between the door means and the obstacle, the control means for distinguishing, during trigger of the warning means, between at least two selectable warning stages as a function of the output signal of the door sensing means.

15. A door system for a motor vehicle including a tailgate, comprising:
   an environmental sensor configured to detect an obstacle in a surrounding area above the motor vehicle; and
   a control unit configured to detect an imminent collision between the tailgate and the obstacle if the tailgate is opened as a function of an output signal of the environmental sensor,
   wherein the tailgate is movable relative to the environmental sensor.

16. A door system for a motor vehicle including a tailgate, comprising:
   an environmental sensor configured to detect an obstacle in a surrounding area above the motor vehicle; and
   a control unit configured to detect an imminent collision between the tailgate and the obstacle if the tailgate is opened as a function of an output signal of the environmental sensor,
   wherein the environmental sensor is arranged on a roof surface of the motor vehicle.

* * * * *